B. C. BALL.
LOGGING ENGINE.
APPLICATION FILED DEC. 22, 1915.
1,306,324. Patented June 10, 1919.
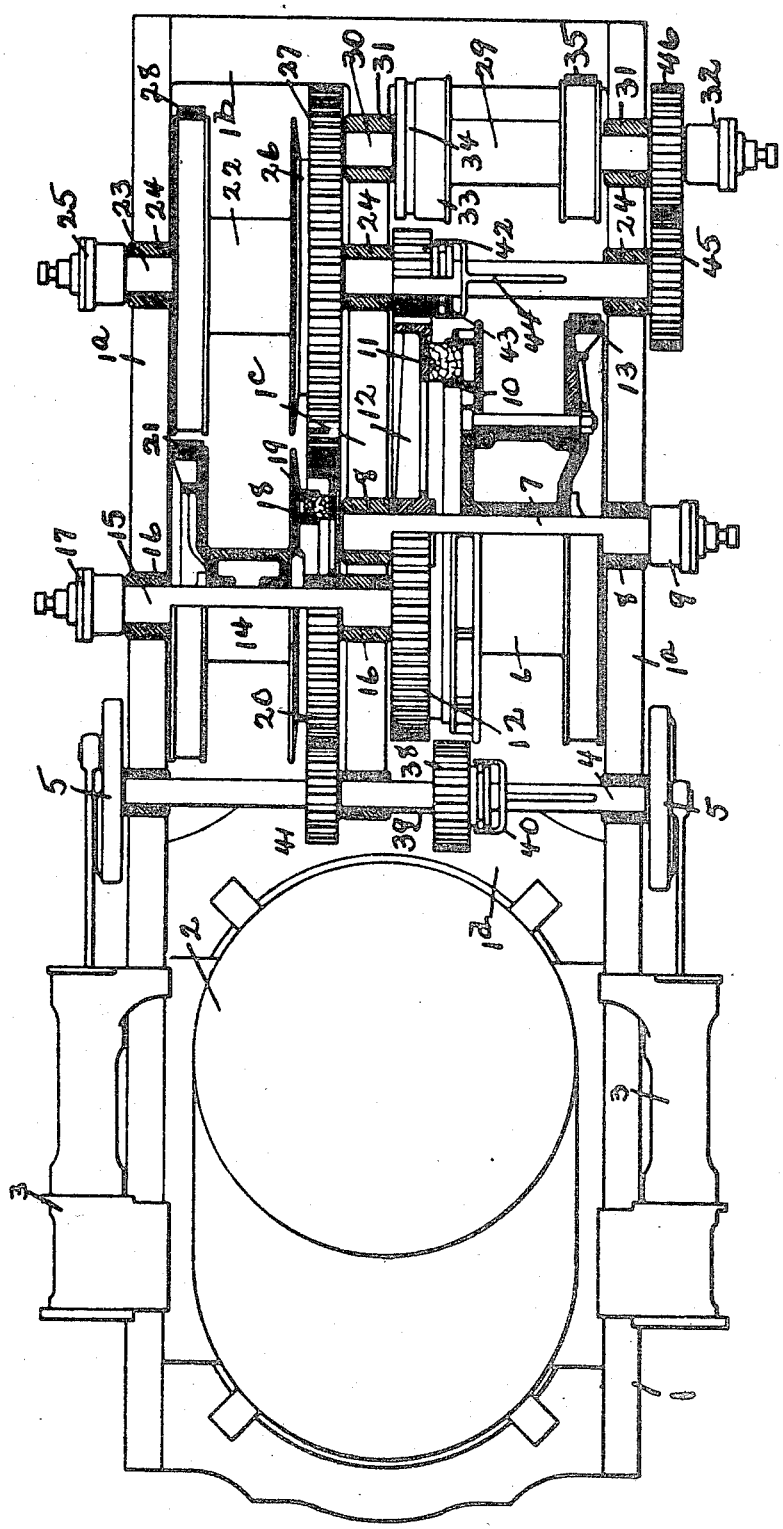

UNITED STATES PATENT OFFICE.

BERT C. BALL, OF PORTLAND, OREGON.

LOGGING-ENGINE.

1,306,324.            Specification of Letters Patent.     Patented June 10, 1919.

Application filed December 22, 1915. Serial No. 68,276.

*To all whom it may concern:*

Be it known that I, BERT C. BALL, a citizen of the United States, residing at Portland, in the county of Multnomah and State of Oregon, have invented new and useful Improvements in Logging-Engines, of which the following is a specification.

This invention relates to logging engines and consists in certain improvements in the construction thereof as will be hereinafter fully described and pointed out in the claims.

The invention is illustrated in the accompanying drawings which show a plan view of a logging engine, some parts being in section to better show construction.

1 marks the frame, 2 the boiler, 3 the engine, 4 the crank shaft, and 5 the crank for driving the crank shaft. Generally this may be of any desired construction although some special features of the frame will be further described. The main drum 6 is mounted on a drum shaft 7. The drum shaft 7 is carried in the bearings 8 and one of the bearings 8 is mounted in the side frame $1^a$ and the central beam $1^c$ of the frame, the central beam being supported at its ends by the end piece $1^b$ of the frame and the cross piece $1^d$. A friction 9 is provided at the end of the shaft. This friction may be of any desired construction and actuates the drum to force it into and out of engagement with its driving member. The main drum has the friction surfaces 10 which engage the friction surfaces 11 on the drum gear 12. These friction surfaces form the clutch through which the action of the friction 9 locks the drum with the gear. This operation of the drum and the manner of locking and releasing it with the gear is well known in the art, an example of such construction being shown in the patent to W. H. Corbett dated Dec. 12, 1905, #807,109.

The main drum is provided with the usual brake band 13 operating on one flange of the drum in the usual manner.

The first trip line drum 14 is mounted on the shaft 15. The shaft 15 is mounted in bearings 16 one of which is mounted on the side $1^a$ of the frame and the other on the central beam $1^c$. This drum is provided with the friction 17 which operates on the drum to force the friction surfaces 18 into engagement with the friction surfaces 19 on the first trip line drum gear 20. This drum is provided with the usual brake band 21 operating upon one of the flanges of the drum in the usual manner. The second trip line drum 22 is mounted on the shaft 23. This shaft is carried sufficiently far forward so that it may extend entirely across the frame in front of the gear 12 of the main drum. It is carried in the bearings 24, the end bearings being on the side frames $1^a$ and the central bearing on the central beam $1^c$. The second trip drum is provided with the friction 25 which forces the friction surfaces 26 into engagement with the friction surfaces (not shown) on the second trip drum gear 27. The usual brake band 28 operates on one of the flanges of the drum as is common.

The heel block drum 29 is mounted in front of the main drum on the shaft 30. The shaft 30 is carried in bearings 31, one of which is carried on the central beam $1^c$ and the other on the side $1^a$. A friction 32 on the end of the shaft 30 forces the friction surfaces 33 and 34 into and out of engagement. The drum is supplied with the usual brake band 35 operating in the usual manner.

The driving scheme for these drums which as well as the arrangement forms the special subject of my invention is as follows: A gear 38 is locked with the primary driving shaft 4 by means of a spline and groove mechanism, the spline being shown at 39. The gear is shifted into and out of mesh with the main drum gear 12 by any convenient mechanism, as shown by the lever 40. When the gear 38 is in mesh with the gear 12 the main drum is given directly from the crank shaft and has a comparatively high rate of speed for this drum.

A gear 41 is fixed on the shaft 4 and drives the first trip line drum gear 20. The gear 27 of the second trip line drum meshes the gear 20. It will be observed that the gear 27 is much larger than the gear 41 so that the shaft 23 driven by the gear 27 rotates much more slowly than the shaft 4. The shaft 23 extends entirely across the frame and the gear 42 is slidingly mounted on this shaft and locked against rotation by the key 43. The gear may be shifted into and out of mesh with the gear 12 by any convenient mechanism, as shown by a lever 44. It will be observed that either of the gears 42 or 38 may be thrown into mesh with the gear 12 and that when the gear 42 is operating the gear 12, it rotates the gear 12 very much more slowly than does the gear 38, on the other hand, increases the power of the main drum. In this convenient and simple manner, therefore, the main drum may be given two speeds. It will also be observed that whichever of the gears 38 or 42 is thrown into mesh with the gear 12, the main drum is rotated in the same direction and inasmuch as the trip line drums are ordinarily required, this changed speed is accomplished in a very compact space and with very little added mechanism.

The heel block drum 29 which utilizes the small space in front of the main gear is driven from the shaft 23 by means of the gears 45 and 46, the gear 45 being fixed on the shaft 23 and the gear 46 on the shaft 30, these gears being in mesh. With the drums thus arranged three of them, namely, the main drum, the first trip line drum and the heel block drum wind the cable over the tops of the drums so that of the four drums only one drum, the second trip line drum 22, winds the cable under the drum. While I have designated the main drum, first and second trip drums and the heel block drum, this being a desirable use for these drums, it will be understood that they may be used advantageously in other connections.

It will be observed that the gear 12 is much larger than the gear 20 while the gears 38 and 41 are very nearly the same size. The gear 27 is also of approximately the same size as the gear 20 so that the trip line drums 14 and 22 are run as is common in devices of this kind at a very much higher rate of speed than is the main drum 6 even when driven at its higher speed through the gear 38. In running the trip lines it is common with engines of this kind to run them in at a very high rate of speed and as the trip line is wound up the main line is unwound or drawn out from the main drum 6. In the rapid operation of the device it may be desirable to leave the gear 42 or 38 with which the main drum is being operated in mesh with the gear 12. This is possible in the present case because of the friction clutch between the main drum and the gear 12. By this construction it is possible to have the large clutch surface of the gear 12 utilized as a friction clutch and to have the engagement of the gears 38 and 42 with their shafts of a positive nature. This is desirable with the small surfaces available with these latter gears. On the other hand the positive clutches must be used with care if the apparatus is in motion when they are thrown into engagement. The combination here made provides for relieving the gear 12 of the load by disengaging the clutch 11—10 with the usual disengaging mechanism so that the gears 38 and 42 may be readily thrown in with no other load than the gear 12 even when the engine is in operation for handling the other drums. Furthermore the rapid playing-out of the main line does not give to the gears connected with the main drum gear an excessive speed as is common where these gears are in constant engagement and no means provided for disengaging the main drum from the main gear.

What I claim as new is:—

1. In a logging engine, the combination of a main drum; a drum gear; a friction clutch between the drum and gear; a drive shaft; a direct gear connection between the drive shaft and the drum gear; an indirect gear connection between the drum gear and the drive shaft having a different gear ratio than the direct connection, both the direct and indirect connections driving the drum gear in the same direction; means for throwing either of said connections into and out of driving relation; and a second drum driven from the drive shaft independently of said means.

2. In a logging engine, the combination of a main drum; a drum gear; a friction clutch between the drum and gear; a drive shaft; a direct gear connection between the drive shaft and the drum gear; an indirect gear connection between the drum gear and the drive shaft having a different gear ratio than the direct connection, both the direct and indirect connections driving the drum gear in the same direction; and a trip line drum driven from the drive shaft independently of one of said connections and at a greater speed than the main drum with either the direct or indirect connection driving the main drum.

3. In a logging engine, the combination of a main drum; a main drum gear; a friction clutch between said drum and gear; a drive shaft; two driving connections between the drive shaft and the main drum gear, both of said connections driving the drum gear in the same direction, one of said driving connections having a different gear ratio than the other; means for throwing either of said connections into or out of driving relation; and a second drum driven from the drive shaft by one of said connections and independently of said means.

4. In a logging engine, the combination of a main drum; a main drum gear; a friction clutch between said main drum gear and said main drum; two gear connections between the drive shaft and the drum gear, said connections driving the drum in the same direction and having different gear ratios to vary the speed of the drum; means for throwing either of said connections into or out of driving relation; and a second drum driven from the drive shaft independently of said means.

5. In a logging engine, the combination of a main drum; a drum gear; a friction clutch between the drum and gear; a drive shaft; a direct gear connection between the drive shaft and drum gear; an indirect gear connection between the drum gear and drive shaft having a different gear ratio than the direct connection and driving the drum gear in the same direction as the direct connection comprising an intermediate shaft; means for throwing either of said connections into or out of driving relation; and a trip line drum on the intermediate shaft driven from said indirect connection independently of said means and at a higher speed than the main drum with either the direct or indirect connection driving the main drum.

6. In a logging engine, the combination of a main drum; a first trip line drum; a second trip line drum; drum gears for each of said drums, the trip line drum gears being in mesh; shafts on which each of said drums are mounted; a primary driving shaft; a first gear on said primary driving shaft meshing with the main drum gear; means for throwing said primary driving shaft into and out of driving relation through said first gear with said main drum gear; a second gear on said primary driving shaft meshing with the first trip line drum gear; a secondary driving gear on the second trip line drum shaft meshing with the main drum gear; and devices for throwing the second trip line drum shaft into and out of driving relation through said secondary gear with the main drum gear.

7. In a logging engine, the combination of a frame having end pieces, side beams and a central beam; a main drum between one of the sides and the central beam; two trip line drums in the space between the opposite side beam and the central beam; drum shafts for said drums, said shafts having bearings on the central beam and the adjacent side beams; drum gears for said drums, the trip line drum gears being in mesh; a primary driving shaft; a first gear on the primary driving shaft meshing with the main drum gear; devices for throwing said primary driving shaft into and out of driving relation through said first gear with the main drum gear; a second gear on the primary driving shaft in mesh with the first trip line drum gear; a secondary driving gear on the second trip line drum shaft; and devices for throwing said second trip line drum shaft into and out of driving relation through said secondary gear with the main drum gear.

8. In a logging engine, the combination of a main drum; a first trip line drum; a second trip line drum; a heel block drum arranged in front of the main drum and the trip line drums at the same side of the frame as the main drum; drum shafts for said drums; drum gears for said drums, the trip line drum gears being in mesh; a primary driving shaft; a first gear on the primary driving shaft meshing with the main drum gear; a secondary gear on the second trip line drum shaft meshing with the main drum gear; devices for throwing the primary driving shaft into and out of driving relation through the first gear with the main drum gear; devices for throwing the second trip line drum shaft through said secondary gear into and out of driving relation with the drum gear; and a second gear on the second trip line drum shaft meshing with the drum gear of the heel block drum.

In testimony whereof I have hereunto set my hand in the presence of two subscribing witnesses.

BERT C. BALL.

Witnesses:
J. F. BRUENING,
H. V. CARPENTER.